United States Patent
DeStefano et al.

(10) Patent No.: US 7,020,842 B1
(45) Date of Patent: Mar. 28, 2006

(54) METHOD AND APPARATUS FOR PROVIDING DYNAMIC ASSISTANCE FOR DISABLED USER INTERFACE RESOURCES

(75) Inventors: George Francis DeStefano, Rochester, MN (US); Anthony Michael Dunbar, Rochester, MN (US); DeVaughn Lawrence Rackham, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/519,413

(22) Filed: Mar. 3, 2000

(51) Int. Cl.
*G06F 3/00* (2006.01)

(52) U.S. Cl. .................. 715/741; 715/705; 715/708; 715/709

(58) Field of Classification Search ............. 345/764, 345/810, 825, 835, 705, 708, 709, 711, 741, 345/743, 808, 809, 715, 837; 715/741
See application file for complete search history.

(56) References Cited

U.S. PATENT DOCUMENTS

| | | | | |
|---|---|---|---|---|
| 5,175,812 A | * | 12/1992 | Krieger | 345/708 |
| 5,423,034 A | * | 6/1995 | Cohen-Levy et al. | 707/10 |
| 5,734,597 A | * | 3/1998 | Molnar et al. | 708/112 |
| 5,877,757 A | * | 3/1999 | Baldwin et al. | 345/705 |
| 6,146,027 A | * | 11/2000 | Orton | 345/835 |
| 6,256,620 B1 | * | 7/2001 | Jawahar | 707/2 |
| 6,321,334 B1 | * | 11/2001 | Jerger et al. | 713/200 |
| 6,452,607 B1 | * | 9/2002 | Livingston | 715/705 |
| 6,628,311 B1 | * | 9/2003 | Fang | 345/777 |

OTHER PUBLICATIONS

"Jobs Gets the Web Religion" http://davenet.scripting.com/discuss/msgReader$118, Dave Winer, Aug. 14, 1995.

* cited by examiner

*Primary Examiner*—Kieu D. Vu
(74) *Attorney, Agent, or Firm*—Joan Pennington

(57) ABSTRACT

A method, computer program product and apparatus are provided for providing dynamic assistance for disabled user interface resources. Code for disabling controls is identified. A state of the identified control is changed from disabled to disabled with assistance. Assistance text is provided to explain why control is disabled. Code is provided for correcting the condition for disabling control. An assistance icon is displayed for viewing by the user. Responsive to a user selection of the assistance icon, the assistance text is displayed. An adjustment button is displayed. Responsive to a user selection of the adjustment button, the code for correcting the condition for disabling control is used, and an action is executed on eligible items.

13 Claims, 7 Drawing Sheets

| | | | |
|---|---|---|---|
| | | LAST COLLECTED 1/25/00 13:37 PM | |
| USER INVENTORY PROFILE ALL PROFILES | | | |
| PROFILE | ENABLED | PRIVILEGE CLASS | PREV |
| PATO | X | USER | 11/2 |
| PECHACEK | X | SECURITY OFFICER | 1/21 |
| PEGGY | X | SECURITY OFFICER | 11/2 |
| PILGRIM | X | SECURITY OFFICER | 12/3 |
| POA | X | SECURITY OFFICER | |
| PST | X | SECURITY OFFICER | |
| QAUTPRO | X | USER | 10/2 |
| QBRMS | X | USER | SIGN |
| QCOLERV | X | USER | SIGN |
| QDBSHR | | USER | SIGN |
| QDBSHRIG | | USER | SIGN |
| QDFTOWN | | USER | SIGN |
| QDIRSRV | | USER | SIGN |
| QDLFM | | USER | SIGN |
| QDOC | | USER | SIGN |
| QDSNX | | USER | SIGN |
| QEIB | X | USER | SIGN |
| QFNO | X | USER | SIGN |
| QGATE | X | USER | SIGN |

Popup menu:
- USER OBJECTS
- NEW BASED ON
- EDIT
- DELETE
- SEND ●
- PROPERTIES

200

DISABLED 204

DISABLED WITH ASSISTANCE 202

FIG. 2

METHOD AND APPARATUS FOR PROVIDING DYNAMIC ASSISTANCE FOR DISABLED USER INTERFACE RESOURCES

FIELD OF THE INVENTION

The present invention relates generally to the data processing field, and more particularly, relates to a method, computer program product and apparatus for providing dynamic assistance for disabled user interface resources.

DESCRIPTION OF THE RELATED ART

When designing and implementing a graphical user interface (GUI) that includes items in a list, context menus are usually provided which allow the user to perform various actions on the items in the list. In many instances, one or more of the menu items may need to be disabled for certain items in the list. In a list of User IDs, for example, the Delete action might be disabled for certain restricted system profiles. Current technologies only allow the enabled or disabled states for menu items.

The reason a particular menu item is disabled may not be obvious or intuitive to the user of the GUI. This is especially true when multiple items have been selected and the menu item must be disabled due to restrictions that exist on one or more of the selected items. Following the previous example, the Delete option might be available when users, "Dunbar", "DeStefano", and "Rackham" are selected, but would be disabled when users, "Dunbar", "DeStefano", and "QSYS" are selected, since "QSYS" is a restricted profile.

When a large list of items is selected, only one of those items can cause one or more menu actions to be disabled. It can be difficult and frustrating to figure out which item or items for which an action is not valid. Also, since menu items can be disabled for multiple reasons, it can be difficult for the user to determine why the action they wish to perform is not available.

Similarly, options and controls on property pages and wizard screens may need to be disabled for reasons not obvious to the user. Also, similarly some panels and pages must have all questions answered before they will perform their function. When all are not answered, current technology gives the user a message box with a "You must . . ." message.

Also as GUI implementations evolve, the types of items included in existing list controls change and grow. When this occurs, GUI developers have to assess design tradeoffs to determine whether to either break apart and change the existing list containers, which may make it difficult for experienced users to navigate their new release, or to add the new items to existing list containers with additional context menu items. When the developer chooses to add the new items to existing list containers with additional context menu items, the occurrence of scenarios which cause menu items to be disabled can increase significantly, especially where multiple selection is allowed.

A need exists for a method, computer program product and apparatus for providing dynamic assistance for disabled user interface resources.

SUMMARY OF THE INVENTION

A principal object of the present invention is to provide a method, computer program product and apparatus for providing dynamic assistance for disabled user interface resources. Other important objects of the present invention are to provide such method, computer program product and apparatus for providing dynamic assistance for disabled user interface resources substantially without negative effect and that overcome many of the disadvantages of prior art arrangements.

In brief, a method, computer program product and apparatus are provided for providing dynamic assistance for disabled user interface resources. Code for disabling controls is identified. A state of the identified control is changed from disabled to disabled with assistance. Assistance text is provided to explain why control is disabled. Code is provided for correcting the condition for disabling control.

In accordance with features of the invention, an assistance icon is displayed for viewing by the user. Responsive to a user selection of the assistance icon, the assistance text is displayed. An adjustment button is displayed. Responsive to a user selection of the adjustment button, the code for correcting the condition for disabling control is used, and an action is executed on eligible items.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a diagram illustrating an exemplary graphical user interface (GUI) screen in accordance with the preferred embodiment;

DETAILED DESCRIPTION OF THE PREFERRED EMBODIMENTS

Figure 1:
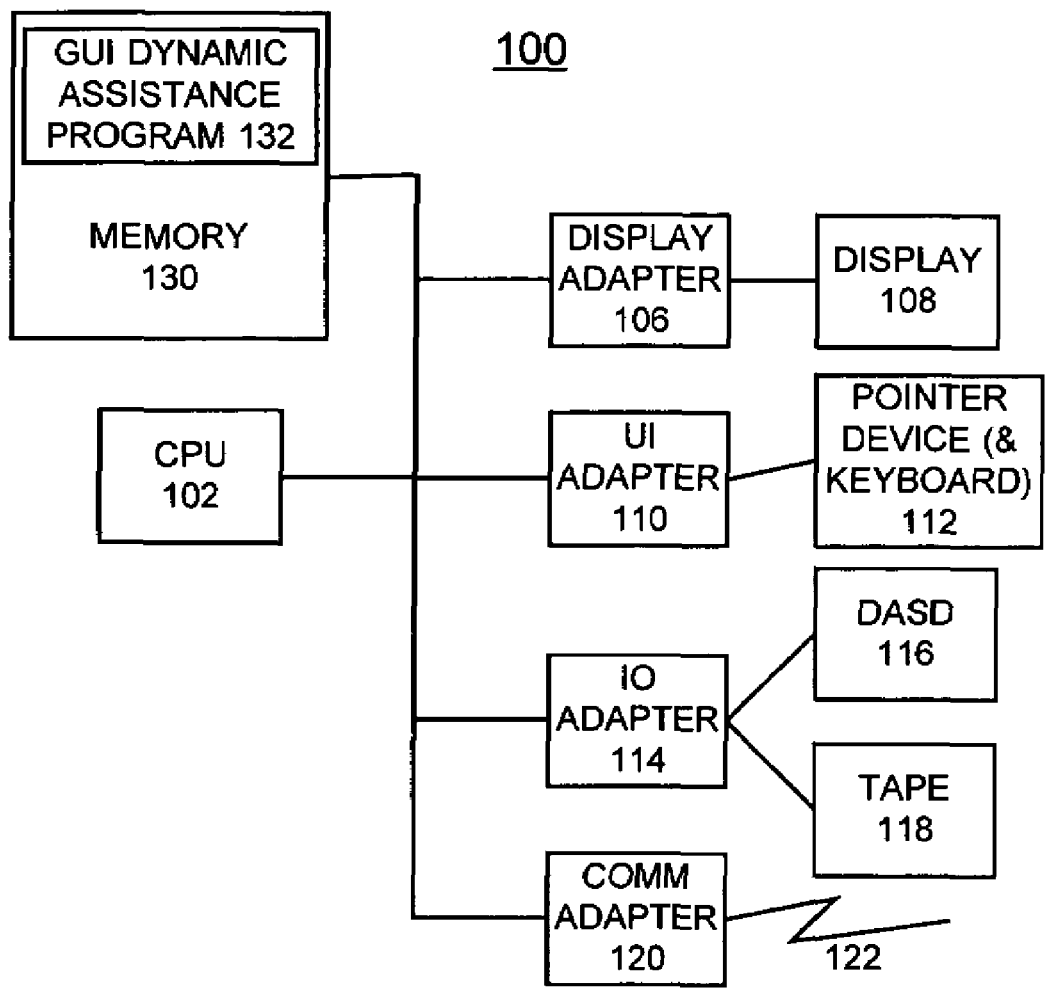
FIG. 1 is a block diagram representation illustrating a computer system for implementing methods for providing dynamic assistance for disabled user interface resources in accordance with the preferred embodiment.

Having reference now to the drawings, in FIG. 1, there is shown a computer or data processing system of the preferred embodiment generally designated by the reference character 100. As shown in FIG. 1, computer system 100 includes a central processor unit (CPU) 102, a display adapter 106 coupled to a display 108. CPU 102 is connected to a user interface (UI) adapter 110 connected to a pointer device and keyboard 112. CPU 102 is connected to an input/output (IO) adapter 114, for example, connected to a direct access storage device (DASD) 116 and a tape unit 118. CPU 102 is connected to a communications adapter 120 providing a communications network connection function with a network 122. The computer system 100 includes a memory 130 storing a graphical user interface (GUI) user dynamic assistance program 132 of the preferred embodiment.

Figure 3:
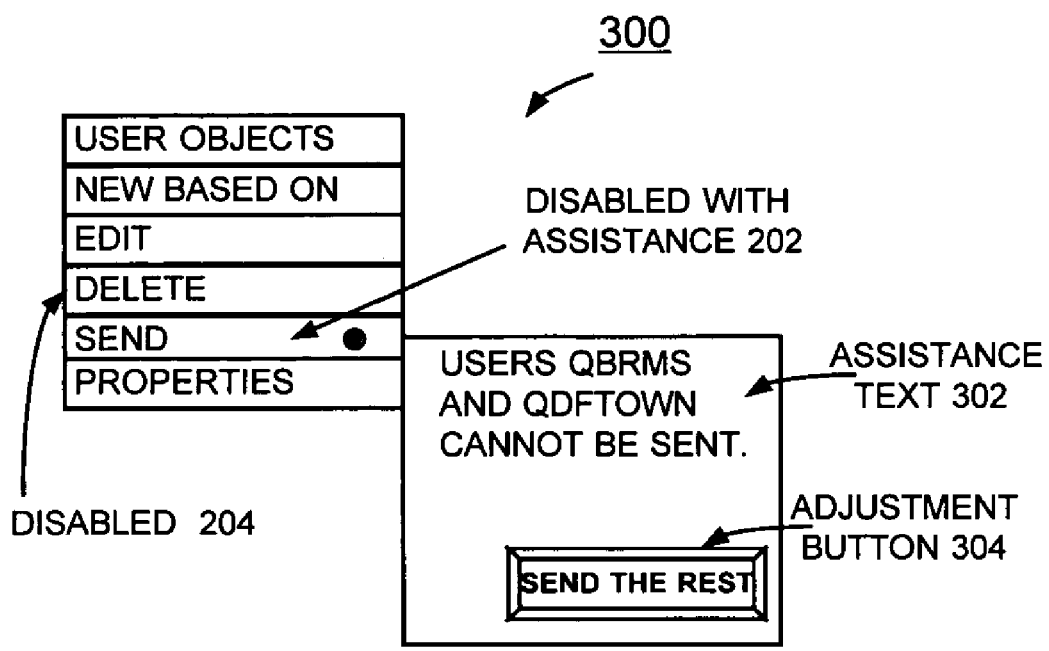
FIG. 3 is a diagram illustrating another exemplary graphical user interface (GUI) screen in accordance with the preferred embodiment.
Figure 4:
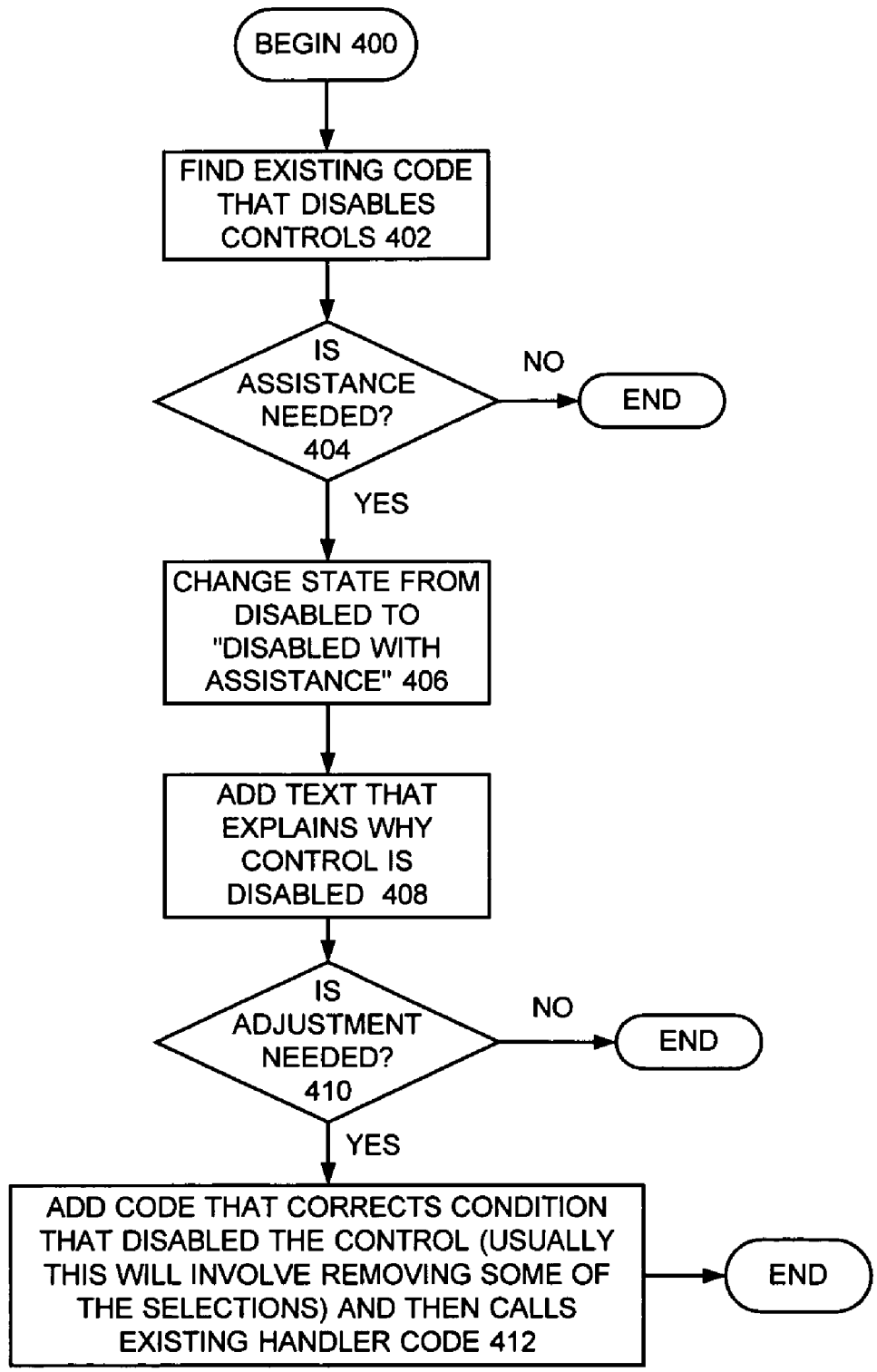
FIGS. 4, 5, and 6 are flow charts illustrating exemplary sequential steps for providing dynamic assistance for disabled user interface resources in accordance with the preferred embodiment.
Figure 5:
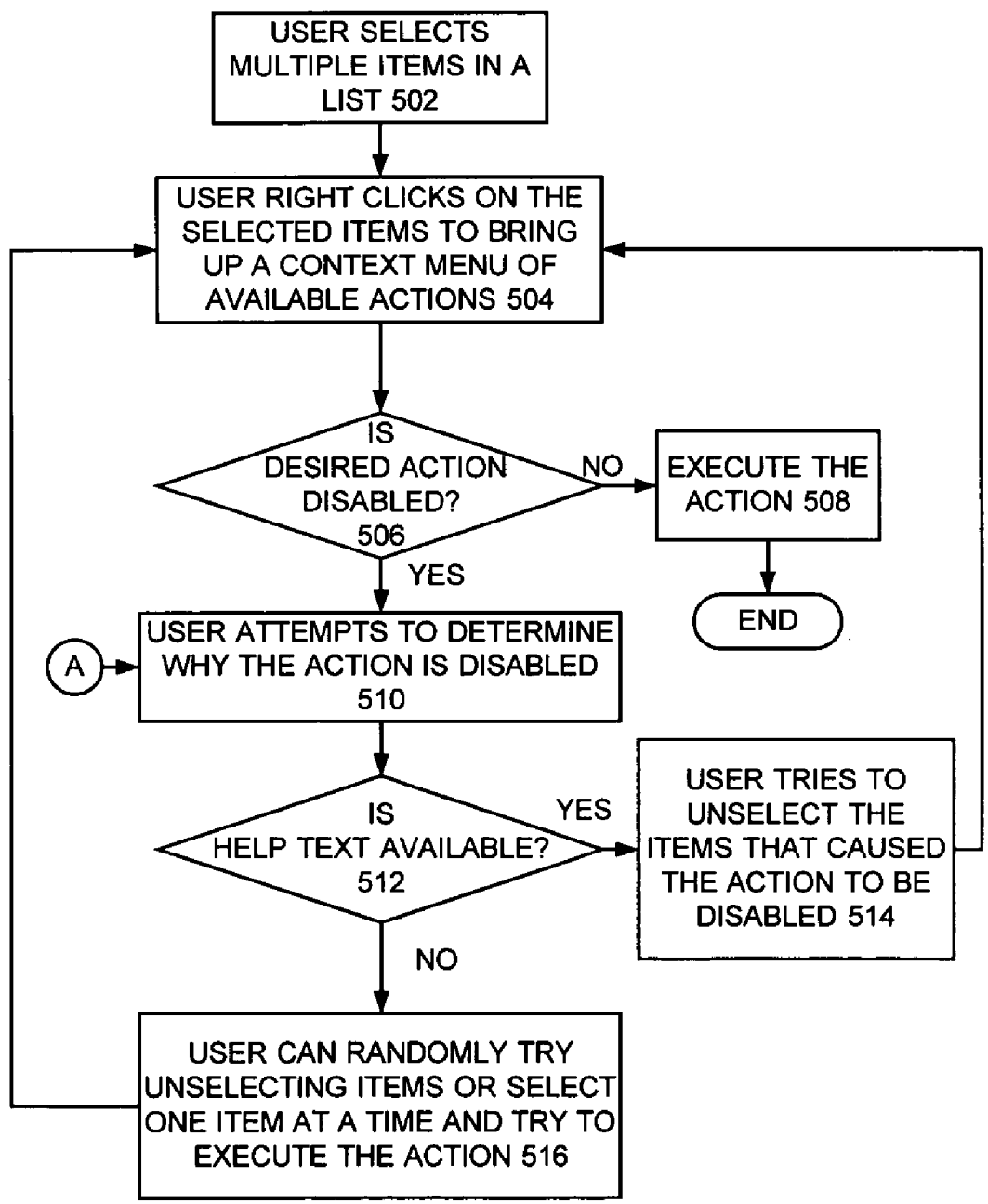
Figure 6:
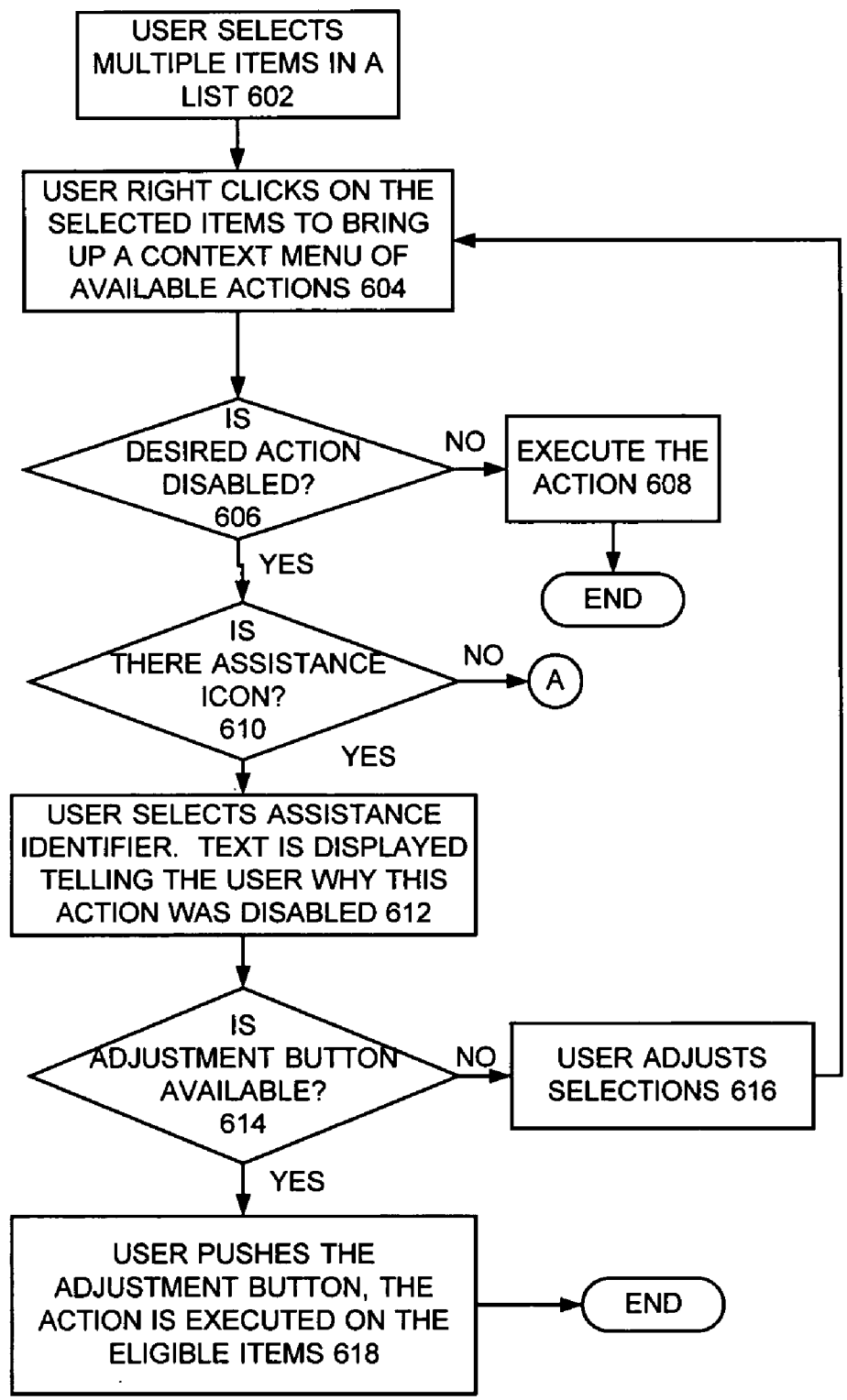

Central processor unit 102 is suitably programmed to execute the flow charts of FIGS. 4, 5, and 6 of the preferred embodiment and for generating a graphical user interface (GUI) screen, such as illustrated and described with respect to FIGS. 2 and 3. Computer 100 may be implemented using any suitable computer, such as an IBM personal computer running the OS/2® operating system.

In accordance with features of the preferred embodiment, a new menu item state, disabled with assistance is provided. This new menu item state disabled with assistance enables GUI designers to create programs that solve design and usage problems otherwise resulting from disabled states in a more intuitive and natural way. When a menu item is changed to disabled with assistance state, the menu item is displayed in a visually distinct manner, such as "grayed out", and accompanied by a distinct audible tone. Just as the current disabled state, it would not be selectable. However, the disabled with assistance menu item has also a live zone added to the end of the menu item. When a user selects this live zone, additional information is displayed that explains to the user why the menu item or control was disabled.

In accordance with features of the preferred embodiment, additionally the GUI designer/developer can provide an adjustment button at the end of the explanation text that change the users selections so that the menu item becomes enabled and optionally performs the associated action on the remaining selected items. In some applications menu items would be "grayed out" because of options selected or decisions made earlier in a multi-step task. In these instances, the GUI designer/developer can provide, instead of an adjustment button, a "where did I go wrong?" button that would take the user to the menu or page where the decision was made and visually highlight the controls with the selections responsible for the disabling. Similarly, the GUI designer/developer can provide a "what did I leave out?" button on the "You must . . . " message box. Pressing this "what did I leave out?" button positions the unanswered question or questions in the viewable window and visually highlights them.

With a disabled with assistance state, the specific reason a menu item was disabled is displayed, making it easy for the user to determine how to proceed. The adjustment button also simplifies the user's task, especially in situations when the user has inadvertently selected items that are restricted from certain actions. When a menu item is disabled, the GUI developer has already written code to determine when the menu item needs to be disabled. It is therefore relatively easy to retrofit existing code to take advantage of the disabled with assistance state. Also the disabled with assistance state gives the GUI developer an option that eases the transition to a new release for an experienced user, without creating confusion for a new user as GUI implementation evolve.

Referring now to FIG. 2, there is shown an exemplary graphical user interface (GUI) screen in accordance with the preferred embodiment generally designated by the reference character 200. A disabled with assistance state 202 is shown with a send menu item. Also a disabled state 204 is shown with a delete menu item. As shown in FIG. 2, a distinguishing circular icon is provided with the disabled with assistance menu item 202.

Referring now to FIG. 3, there is shown another exemplary graphical user interface (GUI) screen in accordance with the preferred embodiment generally designated by the reference character 300. The disabled with assistance state 202 and the disabled state 204 are shown. A user selects or moves the cursor over the disabled with assistance state identifier and an explanation text 302 is displayed. Explanation text 302 tells the user precisely why the particular action was disabled. As shown in FIG. 3, the explanation text 302 indicates that two selected users QBRMS and QDFTOWN cannot be sent. An adjustment button 304 is shown following the explanation text 302. As shown in FIG. 3, the adjustment button 304 indicates send the rest. A user selection of adjustment button 304 changes the users selections so that the menu item becomes enabled and performs the associated send action on the remaining selected items.

Referring now to FIG. 4, there are shown exemplary sequential steps for enabling existing code to use the new disabled with assistance state 204 of the user interface resources in accordance with the preferred embodiment starting at a block 400. First existing code that disables controls is found as indicated in a block 402. Checking whether assistance is needed is performed as indicated in a decision block 404. If assistance is not needed, this completes the sequential steps. When assistance is needed, the state is changed from disabled to disabled with assistance as indicated in a block 406. Next text is added that explains why control is disabled as indicated in a block 408. Checking whether adjustment is needed is performed as indicated in a decision block 410. If adjustment is not needed, this completes the sequential steps. When adjustment is needed, code is added that corrects the condition that disabled the control, for example typically this involves removing some of the selections, and then the existing handler code is called as indicated in a block 412.

Referring now to FIG. 5, there are shown exemplary sequential steps for user handling a disabled control in accordance with the preferred embodiment. A user selects multiple items in a list as indicated in a block 502. The user right clicks on selected items to bring up a context menu of available actions as indicated in a block 504. Checking whether the desired action is disabled is performed as indicated in a decision block 506. If the desired action is not disabled, then the action is executed as indicated in a block 508 and the sequential steps end. Otherwise when the desired action is disabled, the user attempts to determine why the action is disabled as indicated in a block 510. Checking whether there is help text that describes why the action is disabled is performed as indicated in a decision block 512. Many possible causes may be listed for each of the available actions. When help text is available, the user tries to unselect the items that caused the action to be disabled as indicated in a block 514. Then the sequential steps return to block 504 where the user again right clicks on selected items to bring up a context menu of available actions. When help text is not available, the user can randomly try unselecting items or the user can select one item at a time and try to execute the action as indicated in a block 516. Then the sequential steps return to block 504 where the user again right clicks on selected items to bring up a context menu of available actions.

Referring now to FIG. 6, there are shown exemplary sequential steps for user handling a disabled with assistance control in accordance with the preferred embodiment. A user selects multiple items in a list as indicated in a block 602. The user right clicks on selected items to bring up a context menu of available actions as indicated in a block 604. Checking whether the desired action is disabled is performed as indicated in a decision block 606. If the desired action is not disabled, then the action is executed as indicated in a block 608 and the sequential steps end. Otherwise when the desired action is disabled, checking whether there is an assistance icon is performed as indicated in a decision block 610. When no assistance icon is available, then the sequential steps starting at block 510 in FIG. 5 following entry point A are performed. When an assistance icon is available, the user selects or flies the cursor over the assistance identifier, then assistance text is displayed which tells the user exactly why this action was disabled as indicated in a block 612. Checking whether there is an adjustment button is performed as indicated in a decision block 614. When no adjustment button is available, the user adjusts the selections as indicated in a block 616. Then the sequential steps return to block 604 where the user again right clicks on selected items to bring up a context menu of available actions. When an adjustment button is available, the user pushes the adjustment button and the action is executed on the eligible items as indicated in a block 618 and the sequential steps end.

Figure 7:
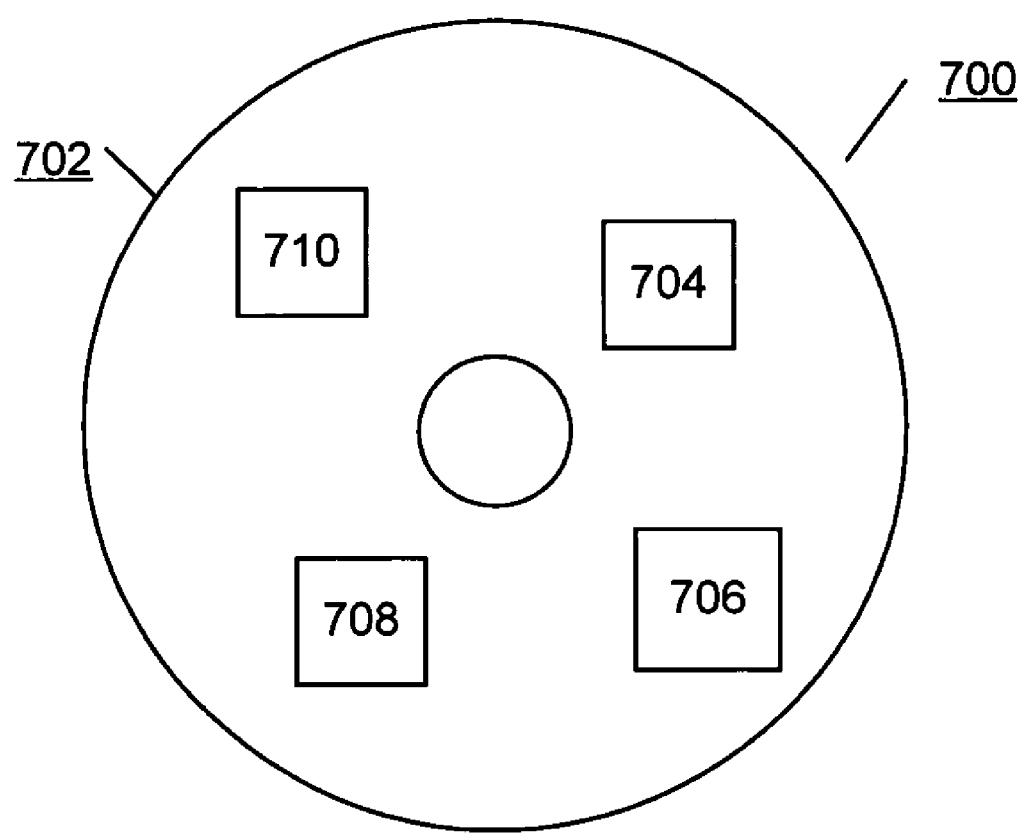
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for providing dynamic assistance for disabled user interface resources of the preferred embodiment in the system 100 of FIG. 1.

A sequence of program instructions or a logical assembly of one or more interrelated modules defined by the recorded program means 704, 706, 708, 710, direct the computer system 100 for providing dynamic assistance for disabled user interface resources of the preferred embodiment.

While the present invention has been described with reference to the details of the embodiments of the invention shown in the drawing, these details are not intended to limit the scope of the invention as claimed in the appended claims.

The invention claimed is:

1. A method for providing dynamic assistance for disabled user interface resources comprising the steps of:
   receiving user selections of multiple items;
   responsive to a predefined user selection on said selected items, displaying a context menu of available actions to be performed on said selected items;
   receiving user selection of a desired action from said available actions;
   if said desired action is disabled, displaying an assistance icon next to said disabled desired action;
   receiving user selection of said assistance icon, displaying assistance text and an adjustment button, said assistance text explaining why said desired action is disabled, and said assistance text identifying one or more selected items being ineligible for said desired action and a privilege class for said one or more ineligible items; and
   removing said one or more ineligible items and executing said desired action on remaining selected items responsive to a user selection of said adjustment button; said adjustment button adding code for removing said one or more ineligible items.

2. A method for providing dynamic assistance for disabled user interface resources as recited in claim 1 includes the step of identifying code for disabled action; and changing a state of said identified code from disabled to disabled with assistance; and wherein displaying said assistance icon is responsive to said changed state of said identified code to disabled with assistance.

3. A method for providing dynamic assistance for disabled user interface resources as recited in claim 2 includes the step of providing code for correcting a condition for disabled action.

4. A method for providing dynamic assistance for disabled user interface resources as recited in claim 3 wherein said step of removing said one or more ineligible items and executing said desired action on remaining selected items responsive to a user selection of said adjustment button is performed utilizing said code for correcting a condition for disabled action.

5. A computer system having apparatus for providing dynamic assistance for disabled user interface resources comprising:
   a processor,
   a memory;
   a display;
   a bus connecting said processor, said memory and said display,
   a GUI dynamic assistance program, said GUI dynamic assistance program performing the steps of:
   receiving user selections of multiple items;
   responsive to a predefined user selection on said selected items, displaying a context menu of available actions to be performed on said selected items;
   receiving user selection of a desired action from said available actions;
   if said desired action is disabled, displaying an assistance icon next to said desired disabled action;
   receiving user selection of said assistance icon, displaying assistance text and an adjustment button, said assistance text explaining why said desired action is disabled, and said assistance text identifying one or more selected items being ineligible for said desired action and a privilege class for said one or more ineligible items; and
   removing said one or more ineligible items and executing said desired action on remaining selected items responsive to user selection of said adjustment button.

6. A computer program product for implementing dynamic assistance for disabled user interface resources, said computer program product including a plurality of computer executable instructions stored on a computer recording medium, wherein said instructions, when executed by a computer, cause the computer to perform the steps of:
   receiving user selections of multiple items;
   responsive to a predefined user selection on said selected items, displaying a context menu of available actions to be performed on said selected items;
   receiving user selection of a desired action from said available actions;
   if said desired action is disabled, displaying an assistance icon next to said desired disabled action;
   receiving user selection of said assistance icon, displaying assistance text and an adjustment button, said assistance text explaining why said desired action is disabled, and said assistance text identifying one or more selected items being ineligible for said desired action and a privilege class for said one or more ineligible items; and
   removing said one or more ineligible items and executing said desired action on remaining selected items responsive to user selection of said adjustment button.

7. A computer program product for implementing dynamic assistance for disabled user interface resources as recited in claim 6 further includes the step of identifying code for disabled action; and changing a state of said identified code from disabled to disabled with assistance;

and wherein displaying said assistance icon is responsive to said changed state of said identified code to disabled with assistance.

8. A computer program product for implementing dynamic assistance for disabled user interface resources as recited in claim 7 further includes the step of providing code for correcting a condition for disabled action.

9. A computer program product for implementing dynamic assistance for disabled user interface resources as recited in claim 8 wherein removing said one or more ineligible items and executing said desired action on remaining selected items responsive to said user selection of said adjustment button utilizes said code for correcting said condition for disabled action.

10. A method for providing dynamic assistance for restricted user interface resources comprising the steps of:

receiving user selections of multiple items;

responsive to a predefined user selection on said selected items, displaying a context menu of available actions to be performed on said selected items;

receiving user selection of a desired action from said available actions;

if said desired action is disabled, displaying an assistance icon next to said desired disabled action;

receiving user selection of said assistance icon, displaying assistance text and an adjustment button, said assistance text explaining why said desired action is disabled, and said assistance text identifying one or more selected items being ineligible for said desired action and a privilege class for said one or more ineligible items; and removing said one or more ineligible items and executing said desired action on remaining selected items responsive to user selection of said adjustment button.

11. A method for providing dynamic assistance for restricted user interface resources as recited in claim 10 includes the step of identifying code for disabled action; and changing a state of said identified code from disabled to disabled with assistance; and wherein displaying said assistance icon is responsive to said changed state of said identified code to disabled with assistance.

12. A method for providing dynamic assistance for restricted user interface resources as recited in claim 11 includes the step of providing code for correcting a condition for disabled action.

13. A method for providing dynamic assistance for restricted user interface resources as recited in claim 12 wherein removing said one or more ineligible items and executing said desired action on remaining selected items responsive to said user selection of said adjustment button utilizes said code for correcting said condition for disable action.

* * * * *